(12) United States Patent
Kodama et al.

(10) Patent No.: US 6,687,031 B1
(45) Date of Patent: Feb. 3, 2004

(54) HOLOGRAPHIC DISPLAY ELEMENT AND METHOD OF MAKING THE SAME

(75) Inventors: Daijiro Kodama, Tokyo (JP); Masachika Watanabe, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 315 days.

(21) Appl. No.: 09/611,680

(22) Filed: Jul. 7, 2000

(30) Foreign Application Priority Data

Jul. 9, 1999 (JP) .......................................... 11-195310

(51) Int. Cl.$^7$ ................................................ G03H 1/26

(52) U.S. Cl. ............................ 359/22; 359/24; 359/900

(58) Field of Search ............................. 359/22, 24, 900

(56) References Cited

U.S. PATENT DOCUMENTS

| | | | |
|---|---|---|---|
| 4,420,218 A | * 12/1983 | Rubanov et al. | 359/22 |
| 5,852,504 A | * 12/1998 | Kato et al. | 359/9 |

* cited by examiner

Primary Examiner—Drew A. Dunn
Assistant Examiner—Craig Curtis
(74) Attorney, Agent, or Firm—Dellett & Walters

(57) ABSTRACT

A holographic display element for three-dimensionally displaying a three-dimensional model and a plane image, for example, in a superimposed manner, which is prevented from causing a change in color or a reduction in contrast of the foreground pattern at an overlap between the foreground pattern and the background pattern. The holographic display element is formed from a single reflection type volume hologram layer, wherein a foreground pattern and a background pattern are recorded so that the two patterns can be reconstructed away from each other in space and a portion of the background pattern that is shadowed by the foreground pattern as superimposed thereover is vacant.

3 Claims, 7 Drawing Sheets

HOLOGRAPHIC DISPLAY ELEMENT AND METHOD OF MAKING THE SAME

BACKGROUND OF THE INVENTION

The present invention relates to a holographic display element and a method of making the same. More particularly, the present invention relates to a holographic display element for three-dimensionally displaying a three-dimensional model and a plane image, for example, in a superimposed manner. The present invention also relates to a method of making the holographic display element.

There have heretofore been known holographic display elements, e.g. holograms for graphic arts, for three-dimensionally displaying a three-dimensional model and a plane image, for example, in a superimposed manner. Such a holographic display element is made by a method wherein a three-dimensional model and a plane image, for example, are photographically recorded as separate holograms, and reconstructed images of the two holograms are spatially overlaid and recorded as superimposed images in another single hologram.

The conventional holographic display elements suffer, however, from some problems. That is, at an overlap between a pattern forming the foreground and a pattern forming the background, reconstructed light from the background pattern causes additive color mixture with reconstructed light from the foreground pattern, resulting in a change in color and/or a reduction in contrast of the foreground pattern.

SUMMARY OF THE INVENTION

In view of the above-described problems with the prior art, an object of the present invention is to provide a holographic display element for three-dimensionally displaying a three-dimensional model and a plane image, for example, in a superimposed manner, which is prevented from causing a change in color or a reduction in contrast of the foreground pattern at an overlap between the foreground pattern and the background pattern, and also provide a method of making the holographic display element.

To attain the above-described object, the present invention provides a holographic display element formed from a single reflection type volume hologram layer, wherein a foreground pattern and a background pattern are recorded so that the two patterns can be reconstructed away from each other in space, and that a portion of the background pattern that is shadowed by the foreground pattern as superimposed thereover is vacant.

In addition, the present invention provides a holographic display element formed from a single reflection type volume hologram layer, wherein a foreground pattern and a background pattern are recorded so that the two patterns can be reconstructed away from each other in space, and that diffracted light for reconstructing the background pattern will not enter a pattern area of the reconstructed foreground pattern.

In addition, the present invention provides a method of making a holographic display element. The method includes the steps of making separately a foreground pattern recording intermediate hologram for forming a foreground pattern image and a background pattern recording intermediate hologram for forming a background pattern image, superimposing the foreground pattern recording intermediate hologram and the background pattern recording intermediate hologram over one another, and directing diffracted light from the foreground pattern recording intermediate hologram and diffracted light from the background pattern recording intermediate hologram to enter the same photosensitive material simultaneously, thereby recording a hologram image. At the step of making a background pattern recording intermediate hologram, the background pattern recording intermediate hologram is made by using a background pattern so formed that a portion thereof that is shadowed by the foreground pattern as superimposed thereover is vacant.

In addition, the present invention provides a method of making a holographic display element. The method includes the steps of making separately a foreground pattern recording intermediate hologram for forming a foreground pattern image and a background pattern recording intermediate hologram for forming a background pattern image, superimposing the foreground pattern recording intermediate hologram and the background pattern recording intermediate hologram over one another, and directing diffracted light from the foreground pattern recording intermediate hologram and diffracted light from the background pattern recording intermediate hologram to enter the same photosensitive material simultaneously, thereby recording a hologram image. The foreground pattern recording intermediate hologram is made as a reflection type volume image hologram in which no diffracted light is produced at least in the reflection direction from any area outside the pattern area of the foreground pattern. The background pattern recording intermediate hologram is made as a reflection type volume hologram in which no information is recorded in a portion corresponding to the pattern area of the foreground pattern and no diffracted light is produced from this portion at least in the reflection direction. The foreground pattern recording intermediate hologram and the background pattern recording intermediate hologram are superimposed over one another and aligned so that the pattern area of the foreground pattern of the foreground pattern recording intermediate hologram fills the non-information recording area of the background pattern recording intermediate hologram, and then recording is carried out.

In the first holographic display element according to the present invention, the foreground pattern and the background pattern are recorded so that a portion of the background pattern that is shadowed by the foreground pattern as superimposed thereover is vacant. Therefore, there is neither a change in color nor a reduction in contrast of the foreground pattern image at the overlap between the foreground pattern image and the background pattern image. Accordingly, the three-dimensional effect is favorably enhanced, and the foreground pattern image and the background pattern image can be viewed three-dimensionally even more effectively. Thus, it is possible to obtain a holographic display element exhibiting abundant creativity in design.

In the second holographic display element according to the present invention, the foreground pattern and the background pattern are recorded so that diffracted light for reconstructing the background pattern will not enter the pattern area of the reconstructed foreground pattern. Therefore, a portion of the background pattern image that corresponds to the shadow of the foreground pattern image is invisible, and there is neither a change in color nor a reduction in contrast of the foreground pattern image at an area where the foreground pattern image lies over the shadowed portion of the background pattern image. Thus, the foreground pattern image and the background pattern image give a natural three-dimensional effect to the observer, and it is possible to obtain a holographic display element exhibiting abundant creativity in design.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The holographic display element according to the present invention will be described below in accordance with the method of making the same.

Figure 1:
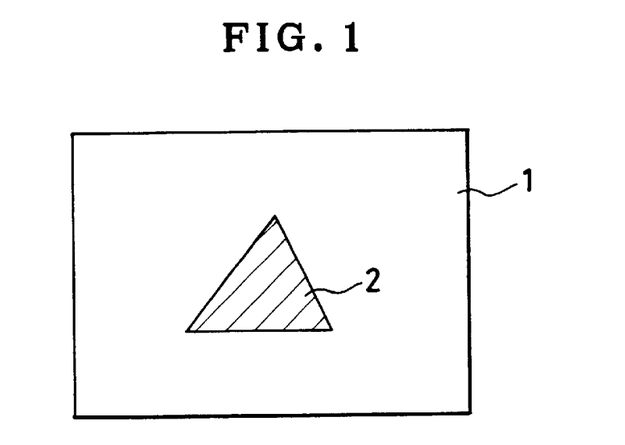
FIG. 1 is a diagram showing an example of a foreground pattern plate used in the making of a first holographic display element according to the present invention.
Figure 2:
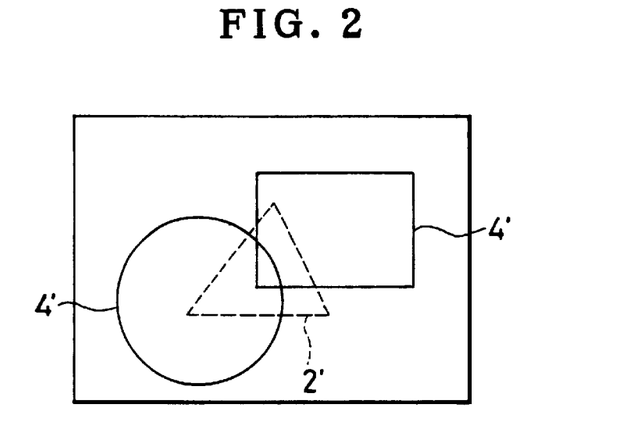
FIG. 2 is a diagram showing the way in which a foreground pattern and a background pattern overlap each other.

A first holographic display element according to the present invention contains the record, for example, of a foreground pattern (triangular pattern) 2 drawn on a foreground pattern plate 1 as shown in FIG. 1 and a background pattern (combined pattern of a circular pattern and a rectangular pattern) 4' as shown in FIG. 2. The foreground pattern 2 and the background pattern 4' are recorded in the form of a volume hologram so that the foreground pattern 2 is displayed in front of the background pattern 4' or superimposed over the latter.

Figure 3:
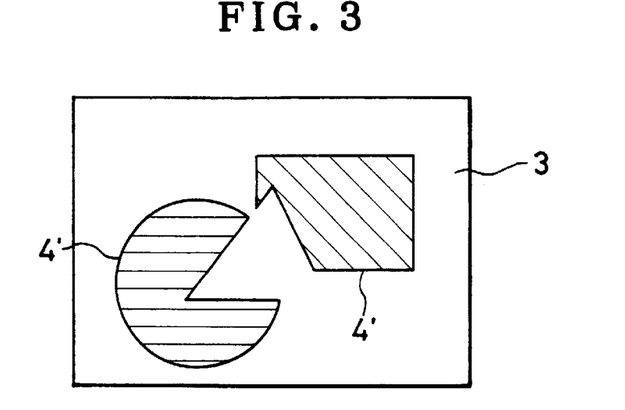
FIG. 3 is a diagram showing an example of a background pattern plate used in the making of the first holographic display element according to the present invention.

In this case, because the foreground pattern shown by the dashed line 2' in FIG. 2 overlaps the background pattern 4', reconstructed light from the background pattern 4' and reconstructed light from the foreground pattern 2' cause additive color mixture, which results in a change in color of the foreground pattern 2' and a reduction in contrast thereof. Therefore, as shown in FIG. 3, a background pattern plate 3 is prepared which has a background pattern 4 drawn thereon such that the portion overlapping the foreground pattern 2 is removed from the background pattern 4' to be displayed. It should be noted that the size of the portion removed from the background pattern 4' to be displayed may be the same as the size of the portion overlapping the foreground pattern 2. However, it is desirable that the size of the portion removed from the background pattern 4' be slightly larger than the size of the portion overlapping the foreground pattern 2 so that when a hologram 31' (FIG. 7) finally made is viewed, an image 2I of the foreground pattern 2 and an image 4I of the background pattern 4 will not be seen overlapping each other even when the visual point E is moved.

An intermediate hologram is photographically recorded by using the foreground pattern plate 1 having the foreground pattern 2 drawn thereon and the background pattern plate 3 with the background pattern 4 drawn thereon.

Figure 4:
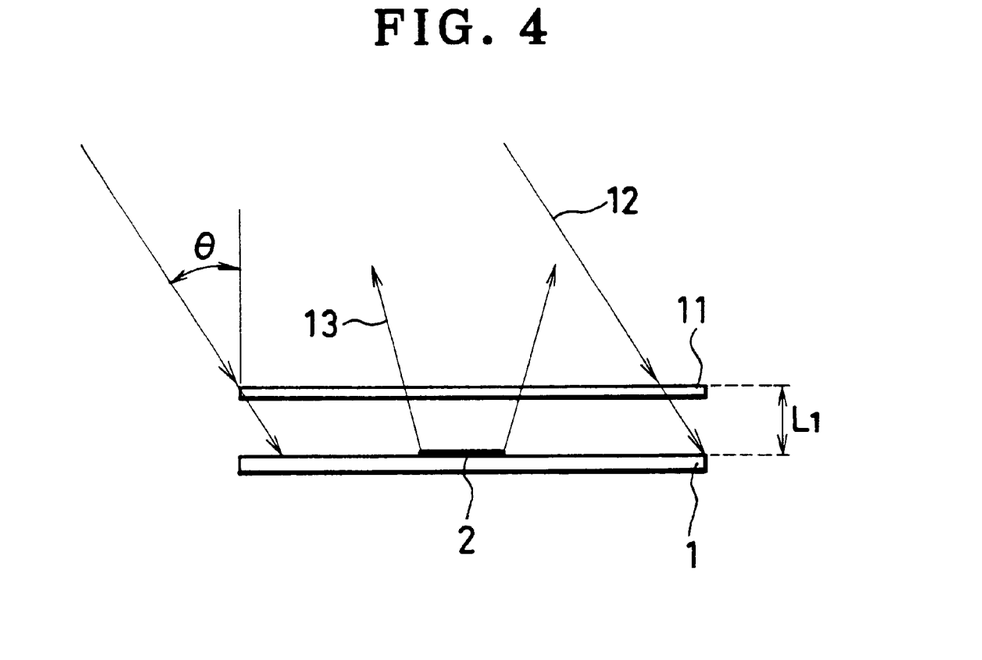
FIG. 4 is a diagram showing an arrangement for photographically recording a foreground pattern recording intermediate hologram by using the foreground pattern plate shown in FIG. 1.

FIG. 4 is a diagram showing an arrangement for photographically recording a foreground pattern recording intermediate hologram 11' by using the foreground pattern plate 1. A volume hologram photosensitive material 11, e.g. a photopolymer, is prepared as a hologram photosensitive material. The foreground pattern plate 1, which is shown in FIG. 1, is placed at a distance $L_1$ from the photosensitive material 11, and illuminating light 12 of three colors, i.e. R (red), G (green) and B (blue), is made incident simultaneously or successively from the photosensitive material 11 side at a predetermined incident angle θ. Consequently, the illuminating light 12 passes through the photosensitive material 11 and is incident on the foreground pattern plate 1, causing scattered light 13 to be produced in the reflection direction from the foreground pattern 2 drawn on the foreground pattern plate 1. The scattered light 13 and the illuminating light 12 interfere with each other in the hologram photosensitive material 11. Thus, a reflection type foreground pattern recording intermediate hologram 11' (FIG. 6) is recorded.

Figure 5:
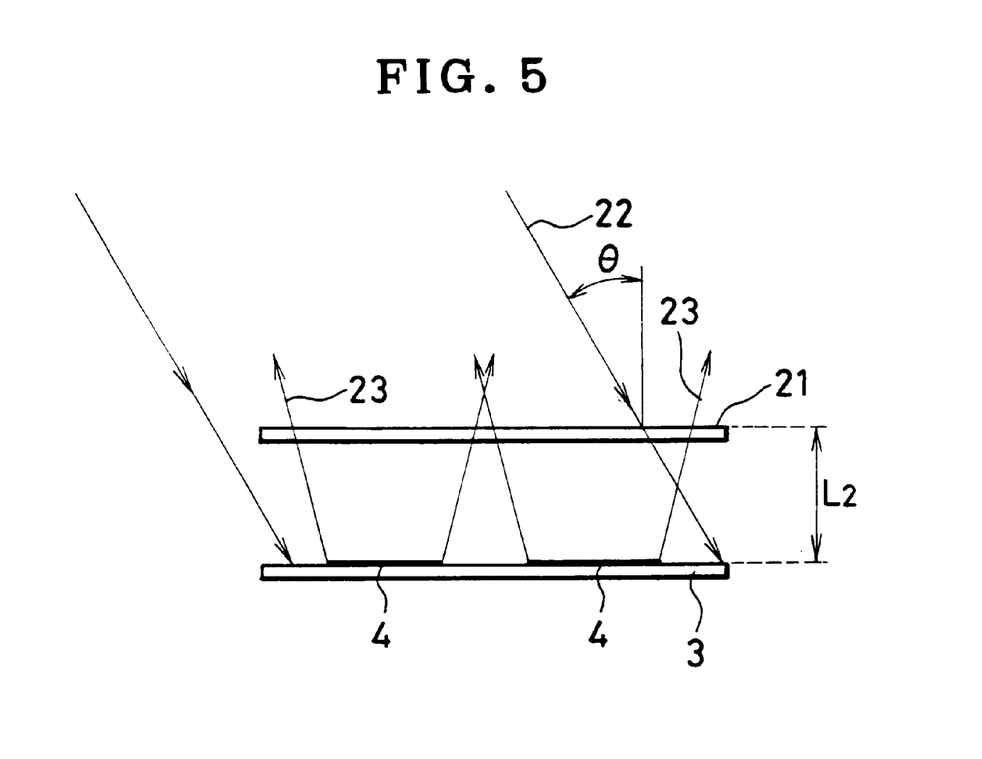
FIG. 5 is a diagram showing an arrangement for photographically recording a background pattern recording intermediate hologram by using the background pattern late shown in FIG. 3.

FIG. 5 is a diagram showing an arrangement for photographically recording a background pattern recording intermediate hologram 21' by using the background pattern plate 3. Another volume hologram photosensitive material 21 similar to the photosensitive material 11 is prepared, and the background pattern plate 3, which is shown in FIG. 3, is placed at a distance $L_2$ ($L_2 > L_1$,) from the photosensitive material 21. Then, illuminating light 22 of three colors, i.e. R, G and B, is made incident simultaneously or successively from the photosensitive material 21 side at the same incident angle θ as in the case of FIG. 4. Consequently, the illuminating light 22 passes through the photosensitive material 21 and is incident on the background pattern plate 3, causing scattered light 23 to be produced in the reflection direction from the background pattern 4 drawn on the background pattern plate 3. The scattered light 23 and the illuminating light 22 interfere with each other in the volume hologram photosensitive material 21. Thus, a reflection type background pattern recording intermediate hologram 21' (FIG. 6) is recorded.

Figure 6:
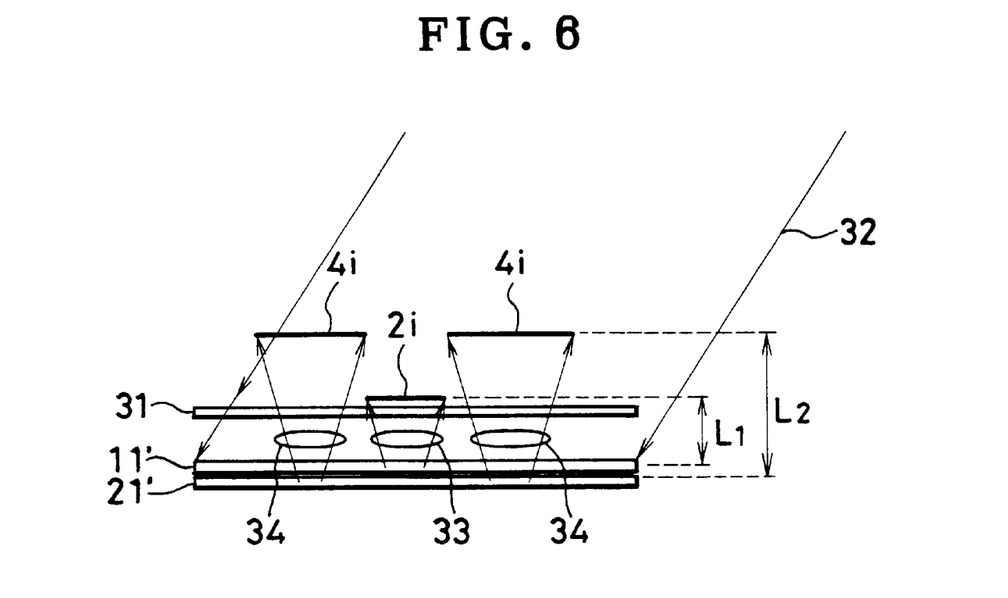
FIG. 6 is a diagram showing an arrangement for photographically recording the first holographic display element according to the present invention by using the foreground pattern recording intermediate hologram and the background pattern recording intermediate hologram.

As shown in FIG. 6, when illuminating light 32 of three colors, i.e. R, G and B, is made incident on the foreground pattern recording intermediate hologram 11' and the background pattern recording intermediate hologram 21' from a direction opposite to the direction of incidence of the illuminating light 12 and 22 at the time of recording the intermediate holograms 11' and 21', diffracted light 33 and 34 are produced from the intermediate holograms 11' and 21', respectively. Thus, an image 2$i$ of the foreground pattern 2 is formed at a distance $L_1$, from the foreground pattern recording intermediate hologram 11', and an image 4$i$ of the background pattern 4 is formed at a distance $L_2$ from the background pattern recording intermediate hologram 21'. Therefore, when illuminating light 32 of three colors, i.e. R, G and B, is made incident on the foreground pattern recording intermediate hologram 11' and the background pattern recording intermediate hologram 21', which are superimposed over one another, from a direction opposite to the direction of incidence of the illuminating light 12 and 22 at the time of recording, as shown in FIG. 6, an image 2$i$ of the foreground pattern 2 and an image 4$i$ of the background pattern 4 are formed away from each other in space by a distance $L_2$ minus $L_1$. Another volume hologram photosensitive material 31 similar to the photosensitive materials 11 and 21 is placed at a position close to the images 2$i$ and 4$i$ in the optical path for image formation (in the illustrated case, a position in close proximity to the image 2$i$ is selected). The diffracted light 33 and 34 and the illuminating light 32 are caused to interfere with each other in the photosensitive material 31 to record a reflection type hologram (holographic display element) 31' (FIG. 7) according to the present invention.

Figure 7:
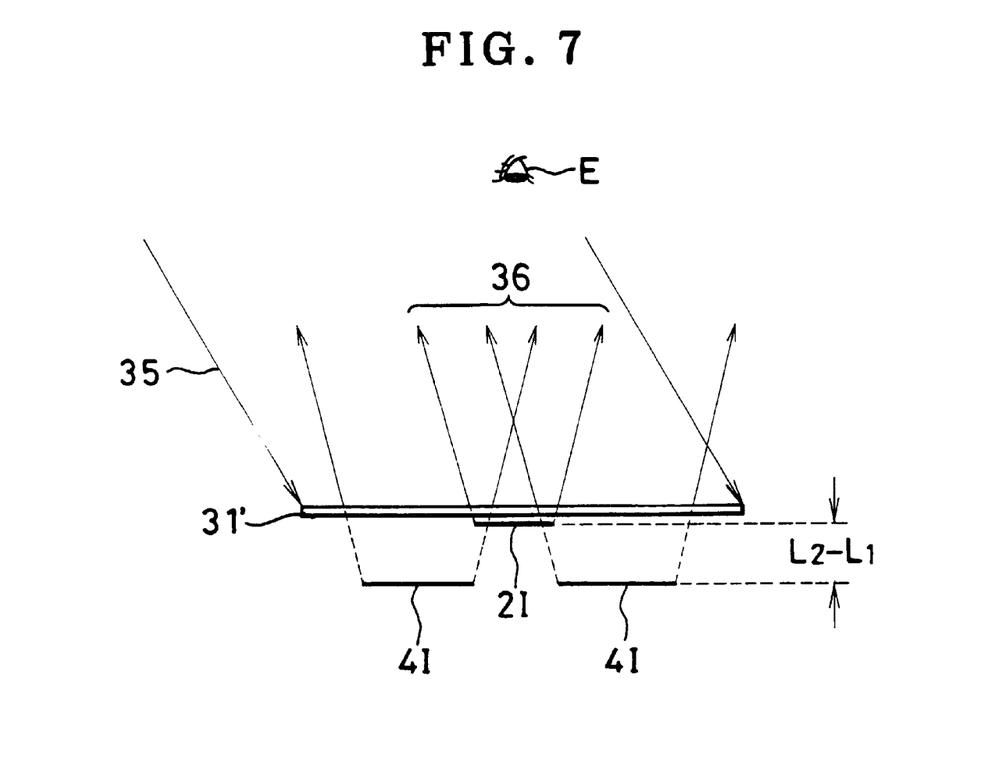
FIG. 7 is a diagram for illustrating the way in which a display image including a foreground pattern and a background pattern is reconstructed from the first holographic display element according to the present invention.

As shown in FIG. 7, white illuminating light 35 is made incident on the holographic display element 31' in a direction opposite to the direction of incidence of the illuminating light 32 at the time of recording. Consequently, diffracted light 36 reconstructs an image 2I of the foreground pattern 2 in a plane in the vicinity of the holographic display element 31' and further reconstructs an image 4I of the background pattern 4 in a plane at a distance $L_2$ minus $L_1$ behind the image 2I. Because a portion of the image 4I of the background pattern 4 that overlaps the image 2I of the foreground pattern 2 is vacant, when the holographic display element 31' is viewed from the front side with the observer's eye E, the image 2I of the foreground pattern 2 is seen nearer to the eye E and the image 4I of the background pattern 4 is seen at a distance $L_2$ minus $L_1$, behind the image 2I. Moreover, no display light comes from a portion of the background pattern image 4I that corresponds to the foreground pattern image 2I. Therefore, there is neither a change in color nor a reduction in contrast of the foreground pattern image 2I at the overlap between the foreground pattern image 2I and the background pattern image 4I. Accordingly, the three-dimensional effect is favorably enhanced, and the foreground pattern image 2I and the background pattern image 4I can be viewed three-dimensionally even more favorably.

Although the first holographic display element according to the present invention has been described above on the basis of the making method, the present invention is not limited to the foregoing embodiment but can be modified in a variety of ways. It should be noted that the holographic display element 31' shown in FIG. 7 may be arranged so that the foreground pattern image 2I or both the foreground pattern image 2I and the background pattern image 4I are formed as real images. For this purpose, in the arrangement shown in FIG. 6, the volume hologram photosensitive material 31 should be positioned between the image 2$i$ of the foreground pattern 2 and the image 4$i$ of the background pattern 4 or more away from the background pattern image 4$i$. If a black or other light-absorbing layer is stacked on a side of the holographic display element 31' reverse to the viewing side, the foreground pattern image 2I and the background pattern image 4I can be displayed even more clearly. It should be noted that the holographic display element according to the present invention may be obtained by holographically replicating the volume hologram 31' made as stated above. That is, the volume hologram 31' is used as a master hologram, and another volume hologram photosensitive material is superimposed thereover to make a copy of the volume hologram 31'.

Next, a second holographic display element according to the present invention will be described in accordance with a method of making the holographic display element.

Figure 8:
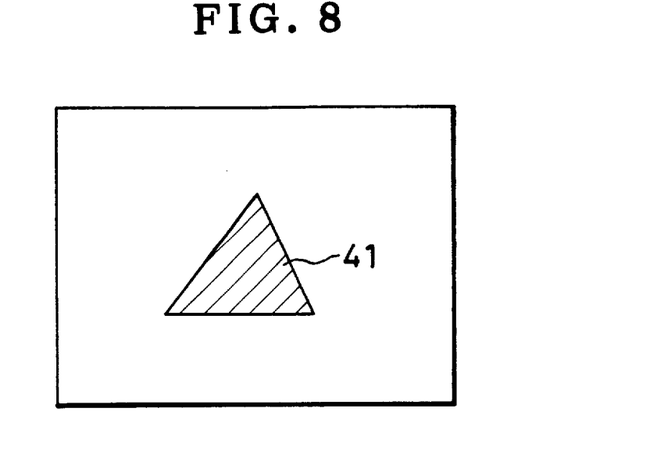
FIG. 8 is a diagram showing an example of a foreground pattern in an embodiment of the second holographic display element according to the present invention.

The second holographic display element according to the present invention contains the record, for example, of a foreground pattern (assumed to be a triangular pattern for the sake of simplicity) 41 drawn on a foreground pattern plate as shown in FIG. 8 and a desired background pattern (either a plane pattern or a three-dimensional pattern). The foreground pattern 41 and the background pattern are recorded in the form of a volume hologram so that the foreground pattern 41 is displayed in front of the background pattern or superimposed over the latter. It is assumed that neither a pattern nor a color is displayed outside the contour of the foreground pattern 41.

Figure 9:
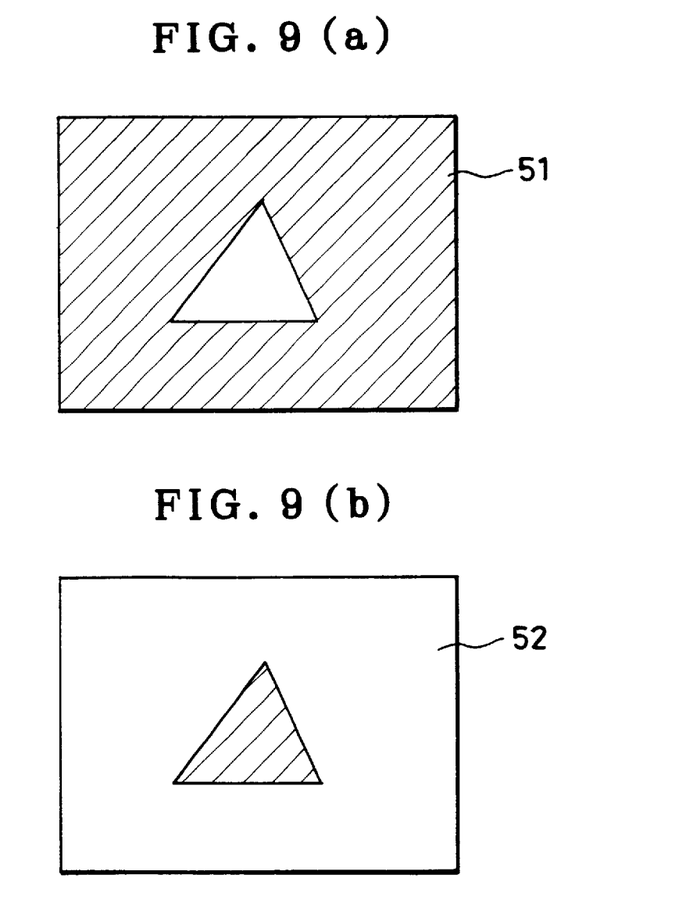
FIG. 9(a) and 9(b) are diagrams showing a negative mask and a positive mask used to make intermediate holograms in correspondence to the foreground pattern.

First, a negative mask 51 is prepared, in which, as shown in FIG. 9(a), the area outside the contour of the foreground pattern 41 is opaque, and the area of the foreground pattern 41 (inside the contour) is transparent. In addition, a positive mask 52 is prepared, in which, as shown in FIG. 9(b), the area of the foreground pattern 41 (inside the contour) is opaque, and the area outside the contour of the foreground pattern 41 is transparent.

Figure 10:
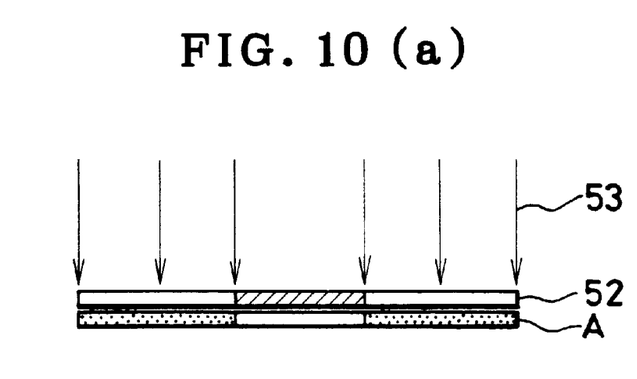
FIG. 10(a) and 10(b) are diagrams showing the way in which photosensitive materials for photographically recording intermediate holograms are partially made to cease to be effective by using the positive mask and the negative mask.

Next, as shown in parts FIGS. 10(a) and 10(b), ultraviolet rays 53 are applied to two volume hologram photosensitive materials A and B of a photopolymer, for example, through the positive mask 52 and the negative mask 51, respectively. Consequently, a portion of the photosensitive material A that corresponds to the area outside the contour of the foreground pattern 41 ceases to be effective, and only a portion of the photosensitive material A that corresponds to the area inside the contour of the foreground pattern 41 is recordable (photosensitive) Conversely, a portion of the photosensitive material B that corresponds to the area inside the contour of the foreground pattern 41 ceases to be effective, and only a portion of the photosensitive material B that corresponds to the area outside the contour of the foreground pattern 41 is recordable (photosensitive).

Next, a reflection type intermediate hologram containing the record of the foreground pattern 41 is made by using the photosensitive material A, and a reflection type intermediate hologram containing the record of a background pattern O (FIG. 12) is made by using the photosensitive material B.

Figure 11:
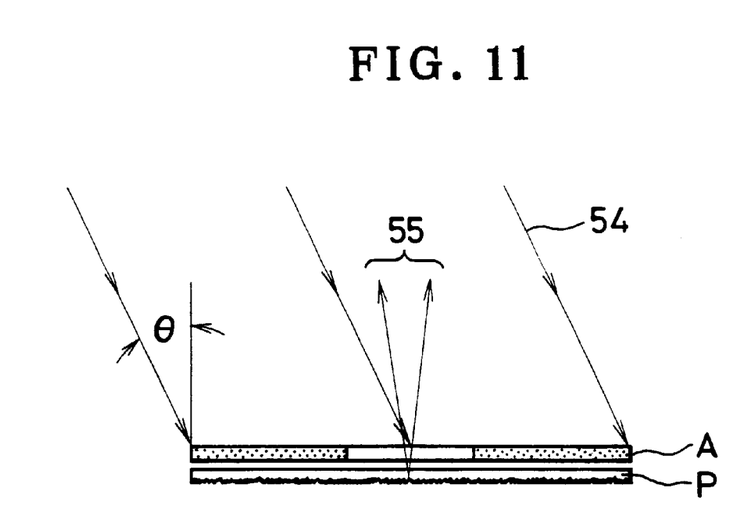
FIG. 11 is a diagram showing an arrangement for photographically recording a foreground pattern recording intermediate hologram.

FIG. 11 shows an arrangement for making an intermediate hologram containing the record of the foreground pattern 41.

A scattering member P on which a pattern drawn in the area of the foreground pattern 41 is drawn is prepared. The above-described photosensitive material A is superimposed over the scattering member P, and illuminating light 54 of three colors, i.e. R, G and B, is made incident simultaneously or successively from the photosensitive material A side at a predetermined incident angle θ. Consequently, the illuminating light 54 passes through the photosensitive material A and is incident on the scattering member P, causing scattered light 55 to be produced in the reflection direction from the foreground pattern 41 drawn on the scattering member P. The scattered light 55 and the illuminating light 54 interfere with each other only in the photosensitive area of the photosensitive material A. Thus, an intermediate hologram A' containing the record of the foreground pattern 41 (FIG. 13) is photographically recorded.

The foreground pattern recording intermediate hologram A' is a reflection type image hologram in which no diffracted light is produced in the reflection direction from the area outside the contour of the foreground pattern 41. The intermediate hologram A' may be made by other methods that can provide similar characteristics. For example, the intermediate hologram A' may be an image hologram recorded in the form of a reflection type volume hologram by placing a subject equivalent to the foreground pattern 41 in front of a deep-black background.

Figure 12:
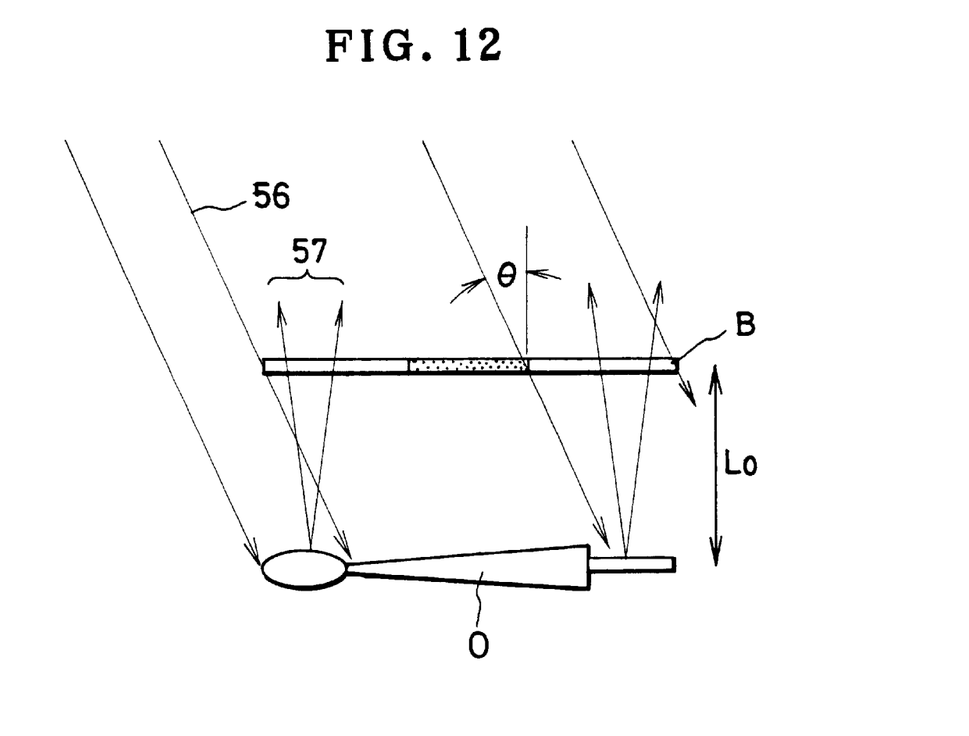
FIG. 12 is a diagram showing an arrangement for photographically recording a background pattern recording intermediate hologram.

FIG. 12 shows an arrangement for making an intermediate hologram containing the record of the background pattern O. The above-described photosensitive material B is placed in front of the background pattern O, which is a plane pattern or a three-dimensional pattern, at a position of distance $L_0$ in this case, and illuminating light 56 of three colors, i.e. R, G and B, is made incident simultaneously or successively from the photosensitive material B side at a predetermined incident angle θ. Consequently, the illuminating light 56 passes through the photosensitive material B and is incident on the background pattern O, causing scattered light 57 to be produced in the reflection direction. The scattered light 57 and the illuminating light 56 interfere with each other only in the photosensitive area of the photosensitive material B (i.e. the area outside the contour of the foreground pattern 41). Thus, an intermediate hologram B' (FIG. 13) containing the record of the background pattern O is photographically recorded.

The background pattern recording intermediate hologram B' is a reflection type hologram in which no information is recorded in a portion corresponding to the area inside the contour of the foreground pattern 41 and no diffracted light is produced in the reflection direction from this portion. The intermediate hologram B' may be made by other methods that can provide similar characteristics.

Figure 13:
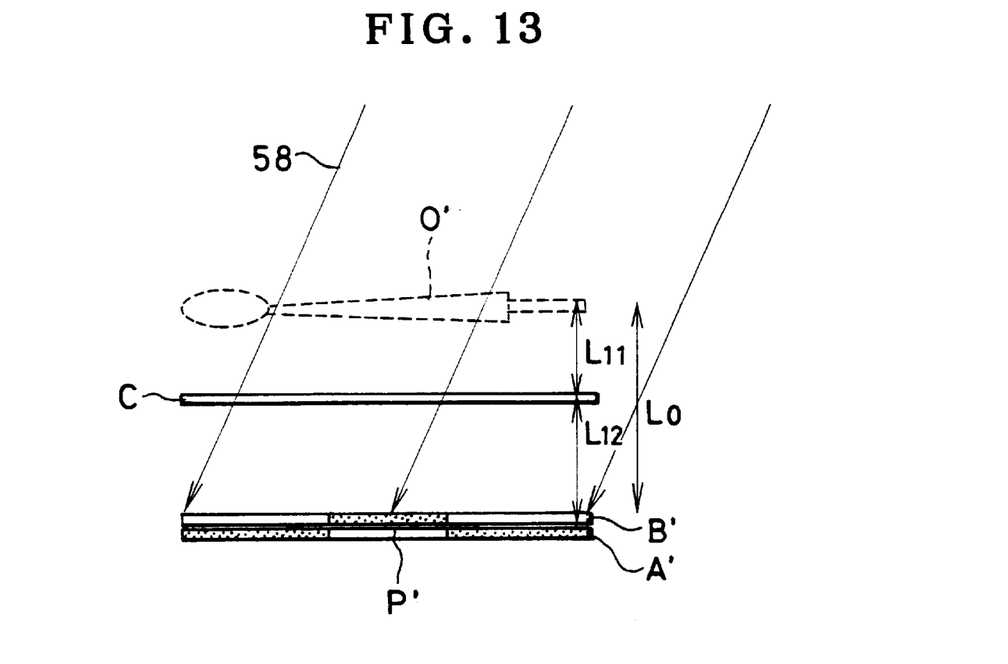
FIG. 13 is a diagram showing an arrangement for photographically recording the second holographic display element according to the present invention by using the foreground pattern recording intermediate hologram and the background pattern recording intermediate hologram.

Next, as shown in FIG. 13, the foreground pattern recording intermediate hologram A' and the background pattern recording intermediate hologram B', which have been made as stated above, are turned over and then superimposed over one another and aligned so that the ineffective areas of the intermediate holograms A' and B' fill each other's recording areas. Although in FIG. 13 the intermediate hologram B' is laid over the intermediate hologram A', the superposition relationship between the two intermediate holograms A' and B' may be reverse to the illustrated example. That is, the intermediate hologram A' may be laid over the intermediate hologram B'. Reconstruction illuminating light 58 of three colors, i.e. R, G and B, is made incident on the superimposed holograms A' and B' simultaneously or successively in a direction opposite to the direction of incidence of the illuminating light 54 and 56 at the time of photographically recording the holograms A' and B'. Consequently, diffracted light is produced in the reflection direction from the recording area of the intermediate hologram B' (i.e. the area outside the contour of the foreground pattern 41), and an image O' of the background pattern is reconstructed at a position of distance $L_0$. In addition, diffracted light is produced in the reflection direction from the recording area of the intermediate hologram A' (i.e. the area inside the contour of the foreground pattern 41), and an image P' of the foreground pattern is reconstructed in the recording area. At this time, another volume hologram photosensitive material C similar to the photosensitive materials A and B is placed at a desired position, i.e. at a distance $L_{12}$ ($L_{12}<L_0$,) from the intermediate hologram B' in the case of FIG. 13, to record the reconstructed background pattern image O' and foreground pattern image P' simultaneously.

Figure 14:
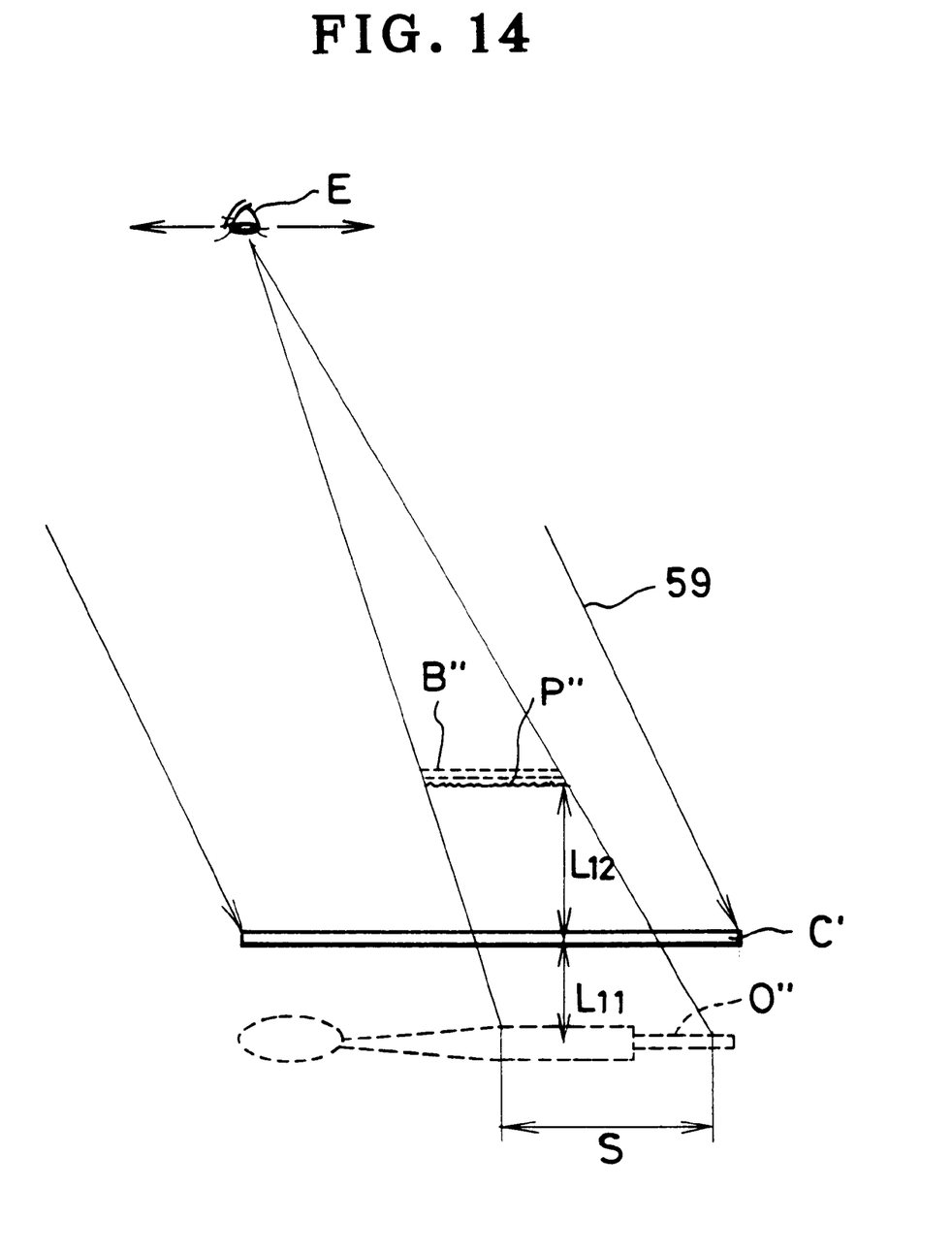
FIG. 14 is a diagram for illustrating the way in which a display image including a foreground pattern and a background pattern is reconstructed from the second holographic display element according to the present invention.

A hologram C' (FIG. 14) recorded in the photosensitive material C is the holographic display element to be attained by the present invention. The holographic display element C' is turned over, and, as shown in FIG. 14, white illuminating light 59 is made incident on the holographic display element C' from a direction opposite to the direction of incidence of the illuminating light 58 at the time of recording the holographic display element C'. Consequently, a background pattern image O" is reconstructed at a distance $L_{11}$ ($=L_0-L_{12}$) behind the hologram C'. In addition, a foreground pattern image P" is reconstructed at a distance $L_{12}$ in front of the hologram C'.

It should be noted that the image of the background pattern recording intermediate hologram B' is reconstructed at the position of the foreground pattern image P", although it is invisible to the eye E. For this reason, diffracted light for reconstructing the background pattern image O" does not enter an area B" corresponding to the ineffective area of the intermediate hologram B' (i.e. the area inside the contour of the foreground pattern 41). This means that when the background pattern image O" is viewed with the eye E from the upper side of FIG. 14, it is impossible to see (observe) a projected area S on the background pattern image O" defined by lines connecting the eye E and the contour of the area B". Accordingly, when the eye E is moved leftward or rightward, the invisible area S also moves in the opposite direction. In contrast, the foreground pattern image P" can be observed regardless of the position of the eye E. Therefore, the foreground pattern image P" is seen nearer to the eye E, and the background pattern image O" is seen at a distance $L_0=L_{12}+L_{11}$ behind the foreground pattern image P". Moreover, the portion S of the background pattern image O" that corresponds to the shadow of the foreground pattern image P" is invisible. Therefore, there is neither a change in color nor a reduction in contrast of the foreground pattern image P" at an area where the foreground pattern image P" lies over the shadowed portion of the background pattern image O". Thus, the foreground pattern image P" and the background pattern image O" give a natural three-dimensional effect to the observer.

Although the second holographic display element according to the present invention has been described above on the basis of the making method, the present invention is not limited to the foregoing embodiment but can be modified in a variety of ways. It should be noted that the holographic display element C' shown in FIG. 14 may be arranged so that both the foreground pattern image P" and the background pattern image O" are formed as real images. For this purpose, in the arrangement shown in FIG. 13, the volume hologram photosensitive material C should be positioned above the background pattern image O'. It should be noted that the holographic display element according to the present invention may be obtained by holographically replicating the volume hologram C' made as stated above. That is, the volume hologram C' is used as a master hologram, and another volume hologram photosensitive material is superimposed thereover to make a copy of the volume hologram C'.

As will be clear from the foregoing description, in the first holographic display element and making method therefor according to the present invention, the foreground pattern and the background pattern are recorded so that a portion of the background pattern that is shadowed by the foreground pattern as superimposed thereover is vacant. Therefore, there is neither a change in color nor a reduction in contrast of the foreground pattern image at the overlap between the foreground pattern image and the background pattern image. Accordingly, the three-dimensional effect is favorably enhanced, and the foreground pattern image and the background pattern image can be viewed three-dimensionally even more effectively. Thus, it is possible to obtain a holographic display element exhibiting abundant creativity in design.

In the second holographic display element and making method therefor according to the present invention, the foreground pattern and the background pattern are recorded so that diffracted light for reconstructing the background pattern will not enter the pattern area of the reconstructed foreground pattern. Therefore, a portion of the background pattern image that corresponds to the shadow of the foreground pattern image is invisible, and there is neither a change in color nor a reduction in contrast of the foreground pattern image at an area where the foreground pattern image lies over the shadowed portion of the background pattern image. Thus, the foreground pattern image and the background pattern image give a natural three-dimensional effect to the observer, and it is possible to obtain a holographic display element exhibiting abundant creativity in design.

What we claim is:

1. A holographic display element comprising a single reflection type volume hologram layer, wherein a foreground pattern and a background pattern having at least a portion thereof overlapping one another, are recorded so that the foreground pattern and the background pattern can be reconstructed away from each other in space, and that a portion of the background pattern that is shadowed by the foreground pattern as superimposed thereover is vacant.

2. A method of making a holographic display element, comprising the steps of:

making separately a foreground pattern recording intermediate hologram for forming a foreground pattern image and a background pattern recording intermediate hologram for forming a background pattern image;

superimposing said foreground pattern recording intermediate hologram and said background pattern recording intermediate hologram over one another, wherein said foreground pattern image and said background pattern have at least a portion thereof overlapping one another when superimposed; and directing diffracted light from said foreground pattern recording intermediate hologram and diffracted light from said background pattern recording intermediate hologram to enter a same photosensitive material simultaneously, thereby recording a hologram image;

wherein at said step of making a background pattern recording intermediate hologram, said background pattern recording intermediate hologram is made by using a background pattern so formed that a portion thereof that is shadowed by a foreground pattern as superimposed thereover is vacant.

3. A method of making a holographic display element, comprising the steps of:

making separately a foreground pattern recording intermediate hologram for forming a foreground pattern image and a background pattern recording intermediate hologram for forming a background pattern image;

superimposing said foreground pattern recording intermediate hologram and said background pattern recording intermediate hologram over one another, wherein said foreground pattern image and a background pattern have at least a portion thereof overlapping one another when superimposed; and directing diffracted light from said foreground pattern recording intermediate hologram and diffracted light from said background pattern recording intermediate hologram to enter a same photosensitive material simultaneously, thereby recording a hologram image;

wherein said foreground pattern recording intermediate hologram is made as a reflection type volume image hologram in which no diffracted light is produced at least in a reflection direction from any area outside a pattern area of a foreground pattern;

wherein said background pattern recording intermediate hologram is made as a reflection type volume hologram in which no information is recorded in a portion corresponding to the pattern area of the foreground pattern and no diffracted light is produced from said portion at least in a reflection direction; and wherein said foreground pattern recording intermediate hologram and said background pattern recording intermediate hologram are superimposed over one another and aligned so that the pattern area of the foreground pattern of said foreground pattern recording intermediate hologram fills a non information recording area of said background pattern recording intermediate hologram, and then recording is carried out.

* * * * *